(12) United States Patent
Park et al.

(10) Patent No.: US 7,476,467 B2
(45) Date of Patent: Jan. 13, 2009

(54) LITHIUM SECONDARY BATTERY WITH HIGH POWER

(75) Inventors: Hey Woong Park, Daejeon (KR); Ji-Sang Yu, Daejeon (KR); Sung-Woo Kim, Daejeon (KR); Min Su Kim, Daejeon (KR)

(73) Assignee: LG Chem, Ltd. (KR)

( * ) Notice: Subject to any disclaimer, the term of this patent is extended or adjusted under 35 U.S.C. 154(b) by 509 days.

(21) Appl. No.: 11/091,072

(22) Filed: Mar. 28, 2005

(65) Prior Publication Data

US 2005/0271943 A1 Dec. 8, 2005

(30) Foreign Application Priority Data

Mar. 29, 2004 (KR) .................... 10-2004-0021205

(51) Int. Cl.
*H01M 4/58* (2006.01)

(52) U.S. Cl. .............. 429/231.1; 429/231.3; 429/231.5; 429/231.6; 429/221; 429/223; 429/224; 423/599; 423/594.1; 423/594.3; 423/594.5

(58) Field of Classification Search ............. 429/231.1, 429/231.3, 231.5, 221, 223, 224, 231.6; 423/599, 423/594.1, 594.3, 594.5
See application file for complete search history.

(56) References Cited

U.S. PATENT DOCUMENTS

| 6,040,089 | A  | * | 3/2000 | Manev et al. | ............ | 429/231.1 |
| 6,248,477 | B1 | * | 6/2001 | Howard et al. | ........... | 429/231.1 |
| 6,482,550 | B1 | * | 11/2002 | Imachi et al. | ............ | 429/231.3 |
| 7,198,871 | B2 | * | 4/2007 | Kitao et al. | ............... | 429/231.3 |
| 2005/0202316 | A1 | * | 9/2005 | Hwang et al. | ............ | 429/231.1 |

FOREIGN PATENT DOCUMENTS

| JP | 2002-110253 | 4/2002 |
| JP | 2003-168430 | 6/2003 |

* cited by examiner

*Primary Examiner*—Laura S Weiner
(74) *Attorney, Agent, or Firm*—Cantor Colburn LLP (57) ABSTRACT

The present invention provides a non-aqueous electrolyte-based high power lithium secondary battery having a long-term service life and superior safety at both room temperature and high temperature, even after repeated high-current charging and discharging, wherein the battery comprises a mixture of a particular lithium manganese-metal composite oxide (A) having a spinel structure and a particular lithium nickel-manganese-cobalt composite oxide (B) having a layered structure, as a cathode active material.

5 Claims, 3 Drawing Sheets

LITHIUM SECONDARY BATTERY WITH HIGH POWER

FIELD OF THE INVENTION

The present invention relates to a non-aqueous electrolyte-based high power lithium secondary battery having a long-term service life and superior safety at both room temperature and high temperature, even after repeated high-current charge and discharge.

BACKGROUND OF THE INVENTION

Recently, strict control and regulation of vehicle emissions, in many countries including the USA and Europe, has accelerated development of electric vehicles (EVs) and hybrid electric vehicles (HEVs) using internal combustion engines and batteries as power sources, thereby partially entering commercialization.

Currently, batteries that can be utilized in EVs or HEVs are high power batteries and for example, Ni-MH secondary batteries, safety of which was verified, are commercially available. In addition, development of lithium secondary batteries having output density and energy density superior to Ni-MH secondary batteries is also actively underway.

However, lithium secondary batteries for use in EVs require not only high energy density and capability to exert large power output within a short period of time, but also a long-term service life of more than 10 years even under severe conditions in which high current charge/discharge cycles are repeated within a short term, thus necessitating remarkably superior safety and long-term service life properties compared to conventional small-size lithium secondary batteries.

Lithium ion batteries that have been used in conventional small size batteries generally employ a layered structure of lithium cobalt composite oxide as a cathode material and graphite-based material as an anode material. However, the main constitutional element of the lithium cobalt composite oxide, cobalt, is very expensive and is not suitable for use in electric vehicles due to safety concerns. Therefore, as the cathode material of lithium ion batteries for EVs, lithium manganese composite oxide having a spinel structure made up of manganese is ideal in terms of both cost and safety. However, the lithium manganese composite oxide, upon high-temperature and high current charge/discharge, undergoes elution of manganese ions into an electrolyte due to the influence of the electrolyte, thus resulting in degradation of battery properties and performance. Thus, there is a need for measures to prevent such problems. In addition, the lithium manganese composite oxide has drawbacks such low charge density as compared to conventional lithium cobalt composite oxide or lithium nickel composite oxide. Thus, there is a limit to charge density of the battery and in order to enter practical use as the powder source of EVs, HEVs, etc., specific designs of the battery to overcome such disadvantages should be effected together.

In order to alleviate the above-mentioned respective disadvantages, various studies and attempts to prepare electrodes using a mixed cathode active material have been made. For example, Japanese Patent Publication Laid-open Nos. 2002-110253 and 2003-168430 disclose techniques utilizing a mixture of lithium manganese oxide and/or lithium cobalt oxide, and lithium nickel-manganese-cobalt composite oxide (B) to enhance recovery output. These techniques, however, suffer from problems associated with inferior cycle life span of the lithium manganese oxide and limited improvement of safety.

SUMMARY OF THE INVENTION

Therefore, it is an object of the present invention to solve the above problems, and other technical problems that have yet to be resolved.

Specifically, an object of the present invention is to provide a cathode active material for a secondary battery, comprising a mixture of a lithium manganese-metal composite oxide (A) having a spinel structure and composed of a particular metal element composition and a lithium nickel-manganese-cobalt composite oxide (B) having a layered structure and composed of a particular metal element composition, such that the cathode active material has superior safety and a long-term service life at both room temperature and high temperature due to improved properties of lithium manganese oxide, even after repeated high current charge and discharge.

Another object of the present invention is to provide a lithium secondary battery comprising the above-mentioned cathode active material. Such a lithium secondary battery may be preferably used as high power, large capacity batteries, in particular, for electric vehicles (EVs) and hybrid electric vehicles (HEVs).

In accordance with an aspect of the present invention, the above and other objects can be accomplished by the provision of a cathode active material for a secondary battery, comprising a lithium manganese-metal composite oxide (A) having a spinel structure and represented by the following General Formula 1 and a lithium nickel-manganese-cobalt composite oxide (B) having a layered structure and represented by the following General Formula 2:

$$Li_{1+x}Mn_{2-x-y}M_yO_4 \qquad \text{General Formula 1}$$

wherein,
$0<x<0.2$;
$0<y<0.1$; and
M is at least one element selected from the group consisting of Al, Mg, Ni, Co, Fe, Ti, V, Zr and Zn.

$$Li_{1-a}Ni_bMn_cCo_{1-b-c}O_2 \qquad \text{General Formula 2}$$

wherein,
$-0.1 \leq a \leq 0.1$;
$0.3 < b < 0.5$; and
$0.3 < c < 0.5$.

In accordance with another aspect of the present invention, there is provided a lithium secondary battery comprising the above-mentioned cathode active material-containing cathode, an anode, a separator and an electrolyte.

Hereinafter, the present invention will be further described.

The present invention is characterized by use of a mixture of a lithium manganese-metal composite oxide (A), wherein a portion of manganese in the lithium manganese oxide having a spinel structure is substituted with other elements, and a lithium nickel-manganese-cobalt composite oxide (B) having a layered structure and a particular metal element composition, as the cathode active material.

Particularly, in the lithium nickel-manganese-cobalt composite oxide (B), the above-mentioned composition ratio ranges of nickel (Ni), manganese (Mn) and cobalt (Co), as will be clearly confirmed in the following examples and comparative examples, are essential with respect to high temperature cycle characteristics and capacity retention characteristics, and safety of the battery.

In the lithium manganese-metal composite oxide (A), among cathode active materials in accordance with the present invention, substitution of Mn with other metals (M=Al, Mg, Ni, Co, Fe, Ti, V, Zr or Zn) further improves high temperature cycle characteristics, as compared to the metal element-unsubstituted lithium manganese oxide. This is because substitution of $Mn^{3+}$ with other metals lowers the concentration of $Mn^{3+}$ directly associated with dissolution of Mn at a high temperature, causing the Jahn-Teller effect, thereby forming a structurally stable oxide. The metal (M) is preferably selected from the group consisting of Mg, Al, Co and Ni.

In the lithium manganese-metal composite oxide (A), when x is greater than 0, lithium ions replace a portion of $Mn^{3+}$, which leads to a decrease of a structurally unstable element, i.e., $Mn^{3+}$, capable of causing the Jahn-Teller effect, and also inhibits elution of trivalent manganese into the electrolyte. On the other hand, where x is below 0, high-temperature cycle characteristics of the battery become poor. In addition, where x is greater than 0.2, the concentration of trivalent manganese ions involved in capacity of the active material remarkably decreases, in the lithium manganese-metal composite oxide (A), which in turn results in decreased charge density of the active material.

In any case, even though it is possible to improve high-temperature cycle characteristics and capacity retention characteristics of the battery, to some degree, by controlling the composition ratio of constitutional elements in the lithium manganese-metal composite oxide (A), there is a limit in respect to high-temperature stability and charge density of the battery. Therefore, the present invention employs, in admixture with the composite oxide (A), an active material, namely, lithium nickel-manganese-cobalt composite oxide (B), which is more stable and thus, it is expected, will increase service life.

The inventors of the present invention have found that the acidity (pH) increases as the weight ratio of lithium nickel-manganese-cobalt composite oxide (B) in such a mixed cathode active material increases. Therefore, it is assumed that such increase of pH assists in improving the service life of the battery by inhibiting elution of manganese ions due to the influence of the electrolyte in the battery, which was a disadvantage exhibited by the lithium manganese-metal composite oxide (A). Upon considering safety and service life of the battery at high temperature, the pH of the cathode active material is preferably in the range of 8.9 to 10.4.

Particularly, in order to secure acceptable battery safety, the mixing ratio between the lithium manganese-metal composite oxide (A) and lithium nickel-manganese-cobalt composite oxide (B) in the cathode active material of the present invention is preferably such that the lithium manganese-metal composite oxide (A) exceeds 50% by weight. This fact can be confirmed in the following examples and comparative examples that will be illustrated below. More preferred mixing ratio is such that the weight ratio of the lithium manganese-metal composite oxide (A) is in the range of 80 to 95%, relative to the total mixture.

Methods of preparing lithium metal composite oxides by varying the composition of metal elements, such as the lithium manganese-metal composite oxide (A) and lithium nickel-manganese-cobalt composite oxide (B), are well known in the art and thus will not be described herein.

Further, in accordance with a further aspect of the present invention, there is provided a lithium secondary battery, comprising an electrode assembly composed of the above-mentioned cathode active material-containing cathode, an anode and a separator, and a non-aqueous electrolyte.

The lithium secondary battery in accordance with the present invention may be broadly divided into, for example, a jelly-roll type and stacking type, depending upon an electrode assembly form. In addition, the lithium secondary battery may be broadly divided into cylindrical, prismatic and pouch type batteries, depending upon the external shape thereof.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

The present invention will now be described in detail with reference to the preferred embodiments and accompanying drawings.

Figure 1:
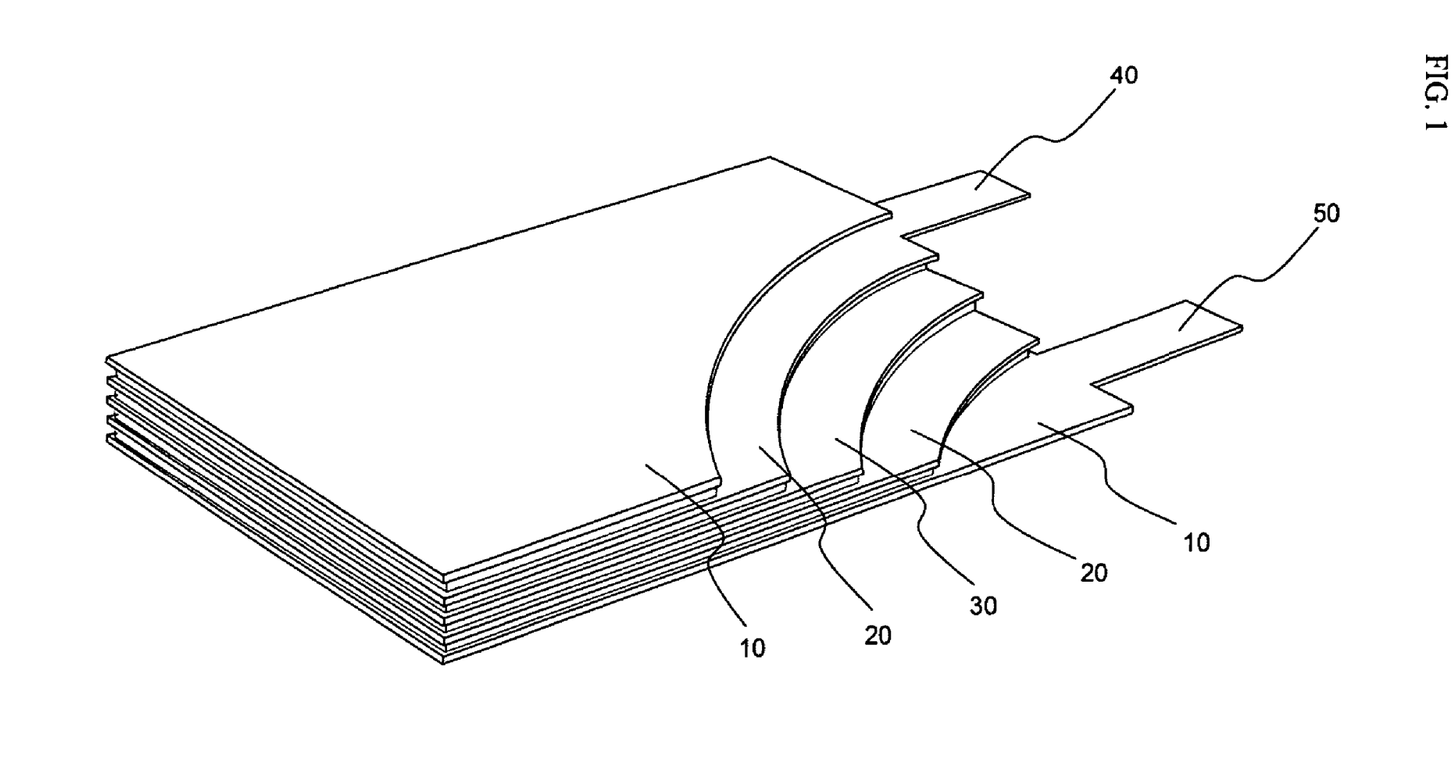
FIG. 1 schematically shows a stacking type electrode assembly that can be used in the lithium secondary battery in accordance with the present invention.
Figure 2:
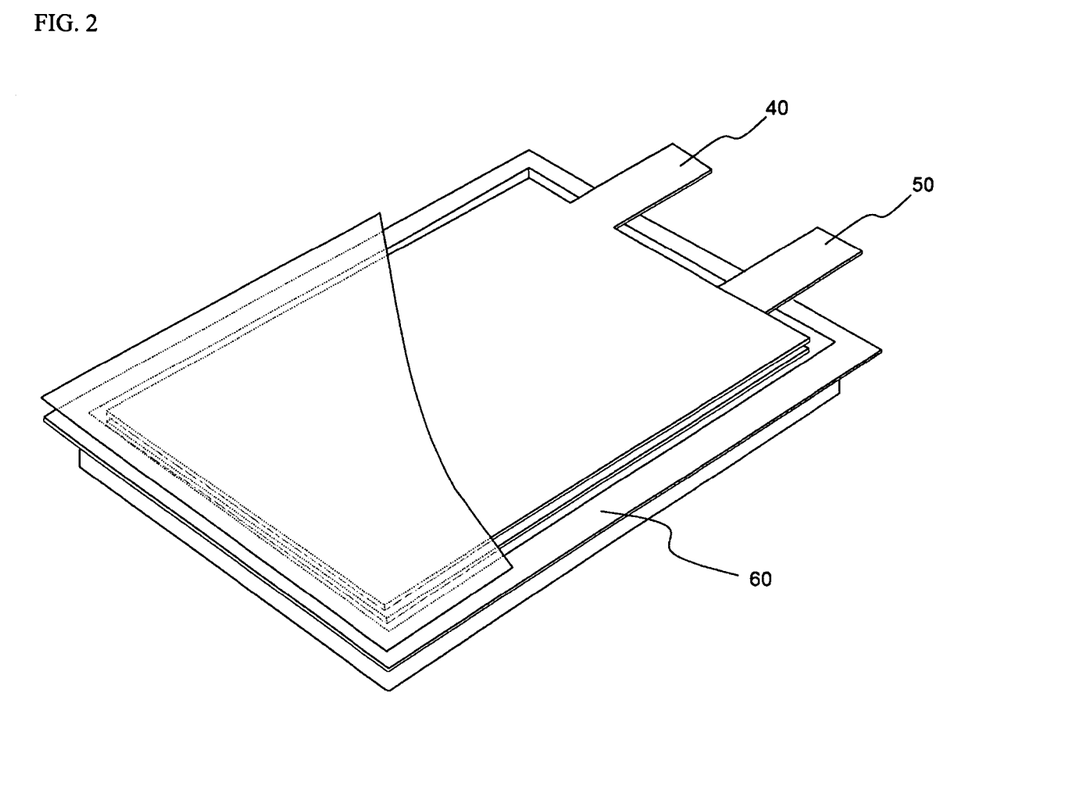
FIG. 2 schematically shows a lithium secondary battery in which the stacking type electrode assembly of FIG. 1 is contained in a pouch type case.

FIG. 1 schematically illustrates an exemplary stacking type electrode assembly that can be used in the lithium secondary battery in accordance with the present invention, and FIG. 2 schematically illustrates an exemplary lithium secondary battery in which such a stacking type electrode assembly is contained in a pouch type case.

Referring to FIGS. 1 and 2, the stacking type electrode assembly has a structure in which a thin sheet-like cathode 1 and anode 2 are positioned adjacent to each other with a separator 3 placed therebetween. As the outer case for the battery, aluminum laminated sheets used in conventional lithium polymer batteries may be employed. The present invention may be applied to any internal structure type of batteries, regardless of stacking or winding type.

The cathode 1 is, for example, fabricated by applying a mixture of the cathode active material in accordance with the present invention, a conductive material and a binder to a cathode current collector, followed by drying. If desired, a filler may be further added to the above mixture.

The cathode current collector is generally fabricated to have a thickness of about 3 to 500 μm. There is no particular limit to cathode current collectors, so long as they have high conductivity without causing chemical changes in the battery. As examples of cathode current collectors, mention may be made of stainless steel, aluminum, nickel, titanium, sintered carbon, and aluminum or stainless steel surface-treated with carbon, nickel, titanium or silver. The current collector may be fabricated to have micro irregularities on the surface thereof so as to enhance adhesiveness to the cathode active material. In addition, the current collector may take various forms including films, sheets, foils, nets, porous structures, foams and non-woven fabrics.

The conductive material utilized in the present invention is typically added in an amount of 1 to 50% by weight, based on the total weight of the mixture including the cathode active material. There is no particular limit to the conductive agent, so long as it has suitable conductivity without causing chemical changes in the battery. As examples of conductive materials, mention may be made of graphite such as natural or artificial graphite; carbon blacks such as carbon black, acetylene black, Ketjen black, channel black, furnace black, lamp black and thermal black; conductive fibers such as carbon fibers and metal fibers; carbon fluoride; metal powder such as aluminum or nickel powder; conductive whiskers such as zinc oxide and potassium titanate; conductive metal oxides such as titanium oxide; polyphenylene derivatives and the like.

The binder is an ingredient assisting in bonding between the active material and conductive material, and in binding to current collectors. The binder utilized in the present invention is typically added in an amount of 1 to 50% by weight, based on the total weight of the mixture including the cathode active material. As examples of the binder, mention may be made of polyfluorovinylidene, polyvinyl alcohols, carboxymethylcellulose (CMC), starch, hydroxypropylcellulose, recycled cellulose, polyvinyl pyrrolidone, tetrafluoroethylene, polyethylene, polypropylene, ethylene-propylene-diene terpolymer (EPDM), sulfonated EPDM, styrene butylene rubber, fluoro rubber and various copolymers.

The filler is an ingredient that inhibits cathode expansion and is optionally employed. There is no particular limit to the filler, so long as it does not cause chemical changes in the battery and is also a fibrous material. As examples of the filler, there may be used olefin polymers such as polyethylene and polypropylene; and fibrous materials such as glass fiber and carbon fiber.

The anode 2 is fabricated by applying an anode material to an anode current collector, followed by drying. If necessary, other components such as conductive materials and binders, as described above, may be further added.

The anode current collector is generally fabricated to have a thickness of 3 to 500 μm. There is no particular limit to anode current collectors, so long as they have suitable conductivity without causing chemical changes in the battery. As examples of anode current collectors, mention may be made of copper, stainless steel, aluminum, nickel, titanium, sintered carbon, copper or stainless steel surface-treated with carbon, nickel, titanium or silver, and aluminum-cadmium alloys. Similar to the cathode current collector, the anode current collector may also be fabricated to form micro irregularities on the surface thereof so as to enhance adhesiveness to the anode active material. In addition, the anode current collector may take various forms including films, sheets, foils, nets, porous structures, foams and non-woven fabrics.

As examples of the anode active materials utilizable in the present invention, mention may be made of carbon such as non-graphitizing carbon and graphite-based carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb, Ge; Me': Al, B, P, Si, group I, II and III elements of the Periodic Table, halogen atoms; $0<x \leq 1$; $1 \leq y \leq 3$; $1 \leq z \leq 8$); lithium metals; lithium alloys; silicon-based alloys; tin alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; and Li—Co—Ni-based materials.

The separator 3 is disposed between the cathode 1 and anode 2. As the separator, an insulating thin film having high ion permeability and mechanical strength is used. The separator typically has a pore diameter of 0.01 to 10 μm and a thickness of 5 to 300 μm. As separators that can be used in the present invention, mention may be made of olefin polymers such as chemically resistant and hydrophobic polypropylene; and sheets or non-woven fabrics made of glass fiber or polyethylene. When a solid electrolyte such as a polymer is employed as the electrolyte, the solid electrolyte may also serve as both the separator and electrolyte.

The non-aqueous electrolyte containing lithium salt is composed of a non-aqueous electrolyte and lithium. As the non-aqueous electrolyte, a non-aqueous electrolyte solution, organic solid electrolyte, inorganic solid electrolyte, etc. may be utilized.

As the non-aqueous electrolyte solution, for example, mention may be made of non-protic organic solvents such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydro Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc.

As examples of the organic solid electrolyte utilized in the present invention, mention may be made of polyethylene derivatives, polyethylene oxide derivatives, polypropylene oxide derivatives, phosphate polymers, poly agitation lysine, polyester sulfone, polyvinyl alcohol, poly(vinylidene fluoride), polymers containing ionic dissociation groups, etc.

As examples of the inorganic solid electrolyte utilized in the present invention, mention may be made of nitrides, halides and sulphates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, etc.

The lithium salt is a material that is readily soluble in non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic carboxylic acid lithium, lithium tetraphenyl borate, imide, etc.

Additionally, in order to improve charge/discharge characteristics and flame retardancy, for example, pyridine, triethylphosphite, triethanolamine, cyclic ether, ethylene diamine, n-glyme, hexamethylphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride and the like may be added to the non-aqueous electrolyte. If necessary, in order to impart incombustibility, the non-aqueous electrolyte may further include halogen-containing solvents such as carbon tetrachloride and ethylene trifluoride. In addition, the non-aqueous electrolyte may further include carbon dioxide gas in order to improve high temperature preservability.

EXAMPLES

Now, the present invention will be described in more detail with reference to the following Examples. These examples are provided only for illustrating the present invention and should not be construed as limiting the scope and sprit of the present invention.

Example 1

Lithium manganese-metal composite oxide (A) of $Li_{1.1}Mn_{1.85}Al_{0.05}O_4$ and lithium nickel-manganese-cobalt composite oxide (B) of LiNi$_{0.4}$Mn$_{0.4}$Co$_{0.2}$O$_2$ were mixed in a weight ratio of 90:10. 1.25 g of the resulting mixture was added to 25 mL of triple distilled water, which was then subjected to ultra-sonication for 30 min, followed by measuring pH using a pH meter. The results are shown in Table 1 below.

Examples 2 through 5

Experiments were repeated using the same procedure as in Example 1, except that the mixing ratio of Li$_{1.1}$Mn$_{1.85}$Al$_{0.05}$O$_4$ to LiNi$_{0.4}$Mn$_{0.4}$Co$_{0.2}$O$_2$ was varied, and the pH of the thus-obtained product was measured. The results are shown in Table 1 below.

Comparative Example 1

An experiment was repeated using the same procedure as in Example 1, except that the mixing ratio (by weight) of Li$_{1.1}$Mn$_{1.85}$Al$_{0.05}$O$_4$ to LiNi$_{0.4}$Mn$_{0.4}$Co$_{0.2}$O$_2$ was 100:0, and the pH of the thus-obtained product was measured. The results are shown in Table 1 below.

Comparative Example 2

An experiment was repeated using the same procedure as in Example 1, except that the mixing ratio (by weight) of Li$_{1.1}$Mn$_{1.85}$Al$_{0.05}$O$_4$ to LiNi$_{0.4}$Mn$_{0.4}$Co$_{0.2}$O$_2$ was 0:100, and the pH of the thus-obtained product was measured. The results are shown in Table 1 below.

TABLE 1

| | Mixing weight ratio of Li$_{1.1}$Mn$_{1.85}$Al$_{0.05}$O$_4$ to LiNi$_{0.4}$Mn$_{0.4}$Co$_{0.2}$O$_2$ | pH |
|---|---|---|
| Example 1 | 90:10 | 9.8 |
| Example 2 | 80:20 | 10.2 |
| Example 3 | 50:50 | 10.4 |
| Example 4 | 30:70 | 10.6 |
| Example 5 | 20:80 | 10.7 |
| Comp. Example 1 | 100:0 | 8.9 |
| Comp. Example 2 | 0:100 | 10.9 |

Example 6

In the same manner as in Example 1, Li$_{1.1}$Mn$_{1.85}$Al$_{0.05}$O$_4$ and LiNi$_{0.4}$Mn$_{0.4}$Co$_{0.2}$O$_2$ were mixed in a weight ratio of 90:10 to prepare a cathode active material. The cathode active material, carbon black and, as a binder, polyvinylidene fluoride (PVDF), in a weight ratio of 85:10:5 were mixed in an organic solvent, NMP, to prepare a slurry. The resulting slurry was applied to both sides of aluminum foil having a thickness of 20 μm and dried to prepare a cathode. A button type battery was assembled using the thus-prepared cathode, a lithium metal as an anode, a porous polyethylene film as a separator, and a 1M LiPF$_6$ EC/EMC solution as an electrolyte.

In order to evaluate high-temperature service life of the thus-prepared battery, the battery was subjected to 50 charge/discharge cycles at a current density of 0.2 C and a temperature of 50° C. Discharge capacity retention rate of the battery was calculated according to the following Equation 1. The results are shown in Table 2 below.

Discharge capacity retention rate (%)=(discharge capacity after 100 charge/discharge cycles/discharge capacity after 1 charge/discharge cycle)× 100   Equation 1

Note: 100 charge/discharge cycles is set to find optimal condition for relative comparison.

Examples 7 through 10

Figure 3:
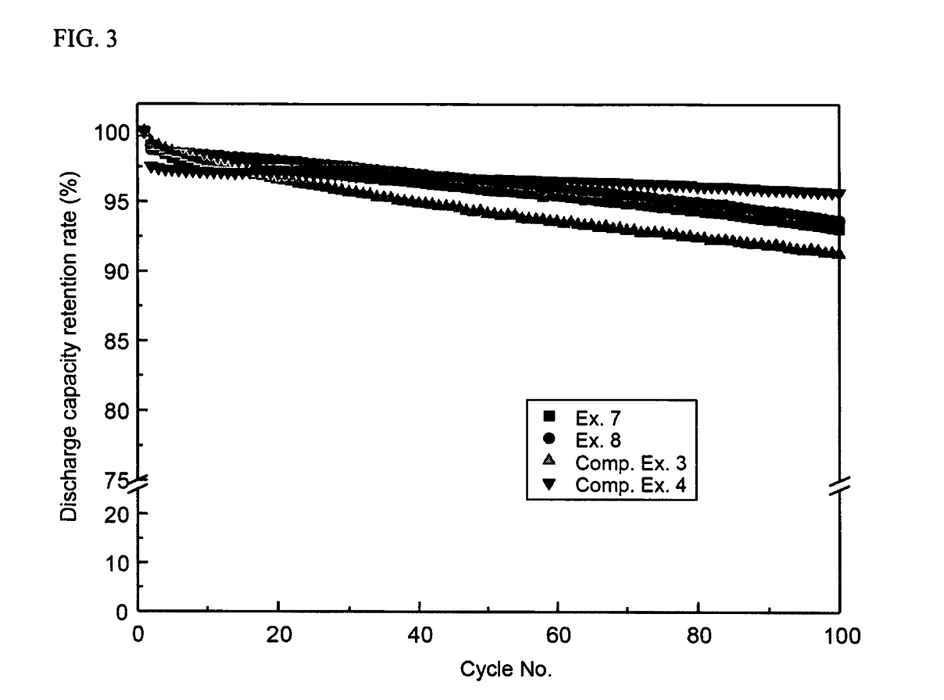
FIG. 3 is a graph showing cycle life span characteristics at 50° C. of batteries prepared in Examples 7 and 8, and Comparative Examples 3 and 4, respectively.

Batteries were assembled using the same procedure as in Example 6, except that the mixisng ratio (by weight) of Li$_{1.1}$Mn$_{1.85}$Al$_{0.05}$O$_4$ to LiNi$_{0.4}$Mn$_{0.4}$Co$_{0.2}$O$_2$ was controlled as listed in Table 2 below, and high temperature service life of the batteries was evaluated. The results are shown in Table 2 below and FIG. 3, respectively.

Comparative Example 3

A battery was assembled using the same procedure as in Example 6, except that the mixing ratio (by weight) of Li$_{1.1}$Mn$_{1.85}$Al$_{0.05}$O$_4$ to LiNi$_{0.4}$Mn$_{0.4}$Co$_{0.2}$O$_2$ was 100:0, and high temperature service life of the battery was evaluated. The results are shown in Table 2 below and FIG. 3, respectively.

Comparative Example 4

A battery was assembled using the same procedure as in Example 6, except that the mixing ratio (by weight) of Li$_{1.1}$Mn$_{1.85}$Al$_{0.05}$O$_4$ to LiNi$_{0.4}$Mn$_{0.4}$Co$_{0.2}$O$_2$ was 0:100, and high temperature service life of the battery was evaluated. The results are shown in Table 2 below and FIG. 3, respectively.

TABLE 2

| | Mixing weight ratio of Li$_{1.1}$Mn$_{1.85}$Al$_{0.05}$O$_4$ to LiNi$_{0.4}$Mn$_{0.4}$Co$_{0.2}$O$_2$ in cathode active material | Discharge capacity retention rate(%) after 100 cycles at 50° C. | Capacity per gram (mAh/g) | Capacity increase relative to Li manganese-metal composite oxide (A) (%) |
|---|---|---|---|---|
| Example 6 | 90:10 | 93 | 111.7 | 6.2 |
| Example 7 | 80:20 | 93.7 | 117.5 | 11.7 |
| Example 8 | 50:50 | 94.3 | 134.0 | 27.4 |
| Example 9 | 30:70 | 94.9 | 149.1 | 41.7 |
| Example 10 | 20:80 | 95.3 | 156.6 | 48.9 |
| Comp. Example 3 | 100:0 | 91.2 | 105.2 | 0 |
| Comp. Example 4 | 0:100 | 95.7 | 168.2 | 59.9 |

As can be seen from Tables 1 and 2, upon mixing the lithium manganese-metal composite oxide (A) of Li$_{1+x}$Mn$_{2-x-y}$M$_y$O$_4$ and the lithium nickel-manganese-cobalt composite oxide (B) of Li$_{1-a}$Ni$_b$Mn$_c$Co$_{1-b-c}$O$_2$, a pH of the cathode active material increases as the mixing ratio of the composite oxide (B) increases. It is believed that such an increase of pH inhibits elution of manganese ions from the spinel structure composite oxide (A) into the electrolyte, thereby leading to increased service life of the battery at high temperatures. In addition, it can be seen that due to admixing with the lithium nickel-manganese-cobalt composite oxide (B), it is also possible to solve problems associated with low charge density, disadvantageously exhibited by the spinel structure lithium manganese-metal composite oxide (A). Although the cathode active material of Comparative Example 4 exhibits superior discharge capacity retention, this active material suffers from safety problems, as will be seen from Comparative Example 6.

Example 11

A lithium manganese-metal composite oxide (A) of $Li_{1.1}Mn_{1.85}Mg_{0.05}O_4$ and lithium nickel-manganese-cobalt composite oxide (B) of $LiNi_{1/3}Mn_{1/3}Co_{1/3}O_2$ were used in a weight ratio of 90:10 to prepare a cathode active material. The cathode active material, carbon black and as a binder, PVDF in a weight ratio of 85:10:5 were mixed in an organic solvent, NMP to prepare a slurry. The resulting slurry was applied to both sides of aluminum foil having a thickness of 20 μm and dried to prepare a cathode.

Spherical artificial graphite powder having high crystallinity and average particle size of 12 μm and the binder, PVDF were mixed in a weight ratio of 90:10, and then admixed in NMP to prepare a slurry. The resulting slurry was applied to copper foil having a thickness of 10 μm and dried, followed by roll pressing to a thickness of 60 μm so as to prepare an anode.

A stacked type lithium battery, as shown in FIG. 1, was fabricated using the thus-prepared cathode and anode, and a 1M $LiPF_6$ EC/EMC solution as an electrolyte.

When the lithium metal is used as the anode, it is difficult to confirm high power output higher than 5 C, due to slow diffusion rate of the lithium metal. Therefore, using carbon as the anode, life span performance of the battery upon charge/discharge with high current pulse was tested.

Figure 4:
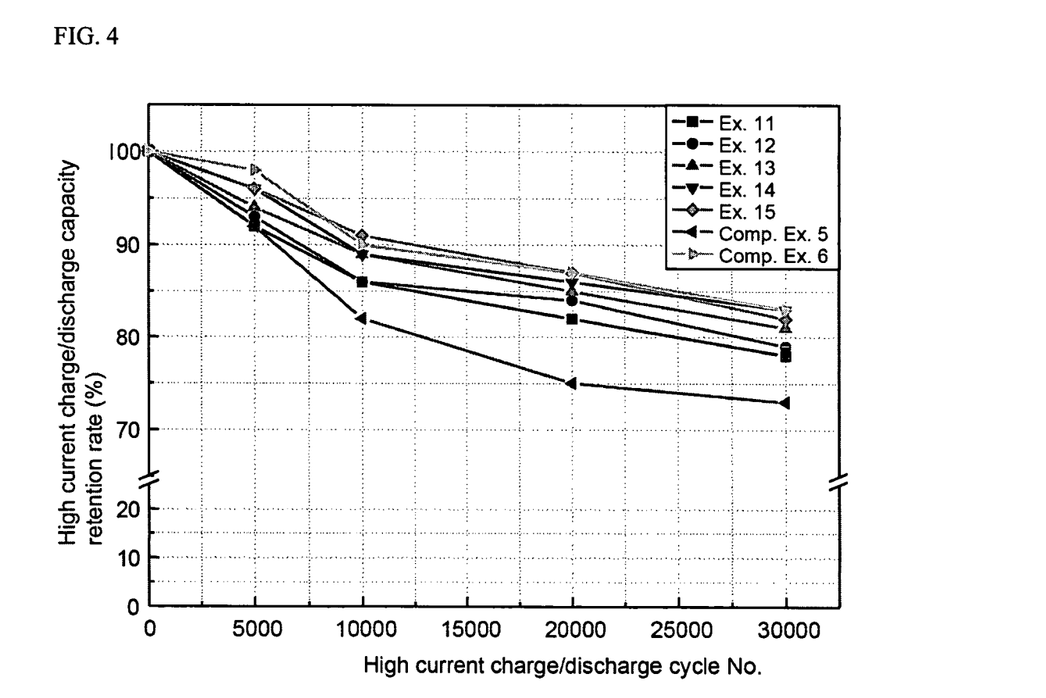
FIG. 4 is a graph showing high current charge/discharge cycle life span characteristics at room temperature of batteries prepared in Examples 11 and 15, and Comparative Examples 5 and 6, respectively.

In order to evaluate the life span performance of the battery upon charge/discharge with high current pulse, a large number of charge/discharge were repeated with current of 50 A at room temperature and 40 to 60% DOD (Depth Of Discharge). High current charge/discharge discharge capacity retention rate of the battery was calculated according to the following Equation 2. The results are shown in Table 3 below and FIG. 4, respectively:

High current charge/discharge discharge capacity retention rate (%)=(discharge capacity at initial current density of 1 C after 50 A cycle charge/discharge capacity at initial current density of 1 C)×100    Equation 2

In addition, the battery safety was tested. The results are shown in Table 4 below. Safety testing of the battery was carried out by overcharging the battery to SOC (State Of Charge) of 200 or 20 volts by high current of 32 A and confirming the presence of battery firing.

Examples 12 through 15

Batteries were assembled using the same procedure as in Example 11, except that a mixing ratio (by weight) of $Li_{1.1}Mn_{1.85}Mg_{0.05}O_4$ to $LiNi_{1/3}Mn_{1/3}Co_{1/3}O_2$ was varied. High current pulse charge/discharge life span performance (high load discharge rate) of the batteries was evaluated and safety testing of the batteries was also carried out. The results are shown in the following Tables 3 and 4, and FIG. 4, respectively.

Comparative Example 5

A battery was assembled using the same procedure as in Example 11, except that the mixing ratio (by weight) of $Li_{1.1}Mn_{1.85}Mg_{0.05}O_4$ to $LiNi_{1/3}Mn_{1/3}Co_{1/3}O_2$ was 100:0. High current pulse charge/discharge life span performance (high load discharge rate) of the battery was evaluated and safety testing of the battery was carried out. The results are shown in the following Tables 3 and 4, and FIG. 4, respectively.

Comparative Example 6

A battery was assembled using the same procedure as in Example 1, except that the mixing ratio (by weight) of $Li_{1.1}Mn_{1.85}Mg_{0.05}O_4$ to $LiNi_{1/3}Mn_{1/3}Co_{1/3}O_2$ was 0:100. High current pulse charge/discharge life span performance (high load discharge rate) of the battery was evaluated and safety testing of the battery was carried out. The results are shown in the following Tables 3 and 4, and FIG. 4, respectively.

TABLE 3

| Mixing weight ratio of $Li_{1.1}Mn_{1.85}Mg_{0.05}O_4$ to $LiNi_{1/3}Mn_{1/3}Co_{1/3}O_2$ in cathode active material | Initial discharge capacity retention rate (%) | Discharge capacity retention rate (%) after 5000 cycles | Discharge capacity retention rate (%) after 10000 cycles | Discharge capacity retention rate (%) after 20000 cycles | Discharge capacity retention rate (%) after 30000 cycles |
|---|---|---|---|---|---|
| Example 11 (90:10) | 100 | 92 | 86 | 82 | 78 |
| Example 12 (80:20) | 100 | 93 | 86 | 84 | 79 |
| Example 13 (50:50) | 100 | 94 | 89 | 85 | 81 |
| Example 14 (30:70) | 100 | 96 | 89 | 86 | 83 |
| Example 15 (20:80) | 100 | 96 | 91 | 87 | 82 |
| Comp. Example 5 (100:0) | 100 | 92 | 82 | 75 | 73 |
| Comp. Example 6 (0:100) | 100 | 98 | 90 | 87 | 83 |

As can be seen from Table 3, upon mixing the lithium manganese-metal composite oxide (A) and the lithium nickel-manganese-cobalt composite oxide (B), a high current charge/discharge life span of the battery increases as the mixing ratio of the lithium nickel-manganese-cobalt composite oxide (B) increases. This is believed due to that, even though high current charge/discharge of the lithium secondary battery results in elevated temperature of the battery, a mixed electrode of the spinel structure lithium manganese-metal composite oxide (A) and layered structure lithium nickel-manganese-cobalt composite oxide (B) has a high pH and basically stable structure at high temperature, thereby having effects on increase of battery life span, as also shown in preceding examples.

TABLE 4

| | Mixing weight ratio of $Li_{1.1}Mn_{1.85}Mg_{0.05}O_4$ to $LiNi_{1/3}Mn_{1/3}Co_{1/3}O_2$ in cathode active material | Overcharge |
|---|---|---|
| Example 11 | 90:10 | No fire |
| Example 12 | 80:20 | No fire |
| Example 13 | 50:50 | Fire |
| Example 14 | 30:70 | Fire |
| Example 15 | 20:80 | Fire |
| Comp. Example 5 | 100:0 | No fire |
| Comp. Example 6 | 0:100 | Fire |

From the results of Table 4, it can be seen that in the weight mixing ratio of the lithium manganese-metal composite oxide (A) and lithium nickel-manganese-cobalt composite oxide (B), battery safety can be secured when the proportion of the composite oxide (A) exceeds 50%. This effect is believed due to safety of the spinel structure lithium manganese-metal composite oxide (A). Although, the cathode active material of Comparative Example 5 exhibited superior safety due to no fire in experiments, it suffers from a problem associated with low discharge capacity retention rate after charge/discharge cycles, as can be seen from Table 3.

Example 16

A battery was assembled using the same procedure as in Example 6, except that $Li_{1.08}Mn_{1.87}Al_{0.05}O_4$ was used as the lithium manganese-metal composite oxide (A), instead of $Li_{1.1}Mn_{1.85}Al_{0.05}O_4$, and high temperature service life of the battery was evaluated. The results are shown in Table 5 below.

Comparative Example 7

A battery was assembled using the same procedure as in Example 16, except that $Li_{1.08}Mn_{1.92}O_4$ was used as the lithium manganese-metal composite oxide (A), instead of $Li_{1.08}Mn_{1.87}Al_{0.05}O_4$, and high temperature service life of the battery was evaluated. The results are shown in Table 5.

TABLE 5

| | Discharge capacity retention rate after 100 cycles at 50° C. (%) | Capacity/gram (mAh/g) |
|---|---|---|
| Example 16 | 92.3 | 104.3 |
| Comp. Example 7 | 87.8 | 105.3 |

As can be seen from Table 5, due to substitution of Mn with other metal M, the lithium manganese-metal composite oxide (A) of $Li_{1+x}Mn_{2-x-y}M_yO_4$ [provided, $0<x\leqq0.2$, $0<y\leqq0.1$, and M is at least one element selected from the group consisting of Al, Mg, Ni, Co, Fe, Ti, V, Zr and Zn] is more stable at high temperatures than the spinel structure $Li_{1+x}Mn_{2-x}O_4$ (provided, $0<x<0.2$) lithium manganese oxide without substitution of metal element. This is believed due to that the lithium manganese-metal composite oxide (A) in which Mn was substituted with other metal M results in relatively reduced elution of manganese ions at high temperatures, as compared to the lithium manganese oxide without substitution of metal element.

Examples 17 and 18

A cathode was prepared using the same procedure as in Example 11, except that in a lithium nickel-manganese-cobalt composite oxide (B) of $Li_{1-a}Ni_bMn_cCo_{1-b-c}O_2$, the composition ratio of nickel, cobalt, and manganese was controlled as described in Table 6 below. In order to verify safety of the cathode active material, DSC (Differential Scanning Calorimetry) was performed. Onset temperature and calorie are shown in Table 6 below.

Comparative Examples 8 through 10

Experiments were repeated using the same procedure as in Example 11, except that in a lithium nickel-manganese-cobalt composite oxide (B) of $Li_{1-a}Ni_bMn_cCo_{1-b-c}O_2$, a composition ratio of nickel, cobalt and manganese was controlled as described in Table 6 below. The results are shown in Table 6 below.

TABLE 6

| | $Ni_{(b)}$ | $Mn_{(c)}$ | $Co_{(1-b-c)}$ | $T_{onset}$ | Delta H |
|---|---|---|---|---|---|
| Example 17 | 0.33 | 0.33 | 0.33 | 220 | 67 |
| Example 18 | 0.4 | 0.4 | 0.2 | 260 | 55 |
| Comp. Example 8 | 0.15 | 0.15 | 0.7 | 190 | 210 |
| Comp. Example 9 | 0 | 0 | 100 | 170 | 273 |
| Comp. Example 10 | 0.5 | 0.5 | 0 | 290 | 48 |

As can be seen from Table 6, as the ratio of manganese increases and correspondingly the ratio of cobalt decreases in the lithium nickel-manganese-cobalt composite oxide (B), onset temperature rises and calorie remarkably decreases. In particular, such changes are prominent when the composition of manganese is about 0.3. This fact means that safety of the cathode is improved because manganese in the material is less reactive at high temperature, as compared to cobalt. Although the cathode active material of Comparative Example 10 exhibits results of high onset temperature and low calorie, such an active material has high nickel content, thus disadvantageously causing swelling of the battery.

Example 19

A battery was assembled using the same procedure as in Example 11, except that a cathode active material was prepared using the lithium manganese-metal composite oxide (A) of $Li_{1.1}Mn_{1.85}Mg_{0.05}O_4$ and lithium nickel-manganese-cobalt composite oxide (B) of $LiNi_{1/3}Mn_{1/3}Co_{1/3}O_2$ in a mixing ratio of 70:30, and safety testing of the battery was then carried out. The results are shown in Table 7 below.

Comparative Example 11

A battery was assembled using the same procedure as in Example 11, except that a cathode active material was prepared using the lithium manganese-metal composite oxide (A) of $Li_{1.1}Mn_{1.85}Mg_{0.05}O_4$ and lithium nickel-manganese-cobalt composite oxide (B) of $LiNi_{0.15}Mn_{0.15}Co_{0.7}O_2$ in a mixing ratio of 70:30 and safety testing of the battery was carried out. The results are shown in Table 7 below.

Comparative Example 12

A battery was assembled using the same procedure as in Example 11, except that a cathode active material was prepared using the lithium manganese-metal composite oxide (A) of $Li_{1.1}Mn_{1.85}Mg_{0.05}O_4$ and lithium nickel-manganese-cobalt composite oxide (B) of $LiNi_{0.3}Mn_{0.3}Co_{0.4}O_2$ in a mixing ratio of 70:30 and safety testing of the battery was carried out. The results are shown in Table 7 below.

TABLE 7

| Mixing weight ratio $Li_{1.1}Mn_{1.85}Mg_{0.05}O_4$ to $Li_{1-a}Ni_bMn_cCo_{1-b-c}O_2$ | Ni | Mn | Co | Overcharge |
|---|---|---|---|---|
| Example 19 (70:30) | 1/3 | 1/3 | 1/3 | No fire |
| Comp. Example 11 (70:30) | 0.15 | 0.15 | 0.7 | Fire |
| Comp. Example 12 (70:30) | 0.3 | 0.3 | 0.4 | Fire |

As can be seen from Table 7, even when the weight mixing ratio of the spinel structure lithium manganese-metal composite oxide (A) to the layered structure lithium nickel-manganese-cobalt composite oxide (B) is 70:30, if the composition ratio of Mn is less than 0.3, or the composition ratio of Co is greater than 0.4 in lithium nickel-manganese-cobalt composite oxide (B) of $Li_{1-a}Ni_bMn_cCo_{1-b-c}O_2$ it is impossible to secure safety of the battery. Therefore, in the mixture of the lithium manganese-metal composite oxide (A) and lithium nickel-manganese-cobalt composite oxide (B), particularly the composition ratio of nickel, cobalt and manganese in lithium nickel-manganese-cobalt composite oxide (B) is very important for safety of the battery.

INDUSTRIAL APPLICABILITY

As described above, a non-aqueous electrolyte-based secondary battery using a mixture of the particular lithium manganese-metal composite oxide (A) and particular lithium nickel-manganese-cobalt composite oxide (B) in accordance with the present invention, as a cathode active material, can secure safety of the battery and improve service life thereof even under high current, short period charge/discharge conditions and high temperature conditions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cathode active material for a secondary battery, comprising a lithium manganese-metal composite oxide (A) having a spinel structure and represented by the following general formula 1, and a lithium nickel-manganese-cobalt composite oxide (B) having a layered structure and represented by the following general formula 2:

$$Li_{1+x}Mn_{2-x-y}M_yO_4 \quad (1)$$

$$Li_{1-a}Ni_bMn_cCo_{1-b-c}O_2 \quad (2)$$

wherein,
   $0<x<0.2$;
   $0<y<0.1$;
   M is at least one element selected from the group consisting of Al, Mg, Ni, Co, Fe, Ti, V, Zr and Zn;
   $-0.1 \leq a \leq 0.1$;
   $0.3<b<0.5$; and
   $0.3<c<0.5$, wherein the content of the lithium manganese-metal composite oxide (A) is in the range of 80% to 95%, based on the total weight of the mixture, and the pH of the cathode active material is in the range of $8.9<pH \leq 10.2$.

2. The cathode active material according to claim 1, wherein the metal (M) is selected from the group consisting of Mg, Al, Co and Ni.

3. A lithium secondary battery comprising the cathode active material according to claim 2.

4. A lithium secondary battery comprising the cathode active material according to claim 1.

5. The lithium secondary battery according to claim 4, wherein the battery is used as a high power, large capacity power source.

* * * * *